Patented Nov. 11, 1947

2,430,576

UNITED STATES PATENT OFFICE 2,430,576

PEST CONTROL COMPOSITION AND METHOD

Clarence A. Littler, Maple Heights, Ohio, assignor to E. I. du Pont de Nemours & Company, Wilmington, Del., a corporation of Delaware No Drawing. Application July 18, 1944, Serial No. 545,547

6 Claims. (Cl. 167—42)

This invention relates to compositions and methods for their preparation and is particularly directed to insecticidal and fungicidal compositions and the preparation of such compositions as hydrophobic powders.

This application is a continuation-in-part of my copending application Serial No. 419,696, filed November 19, 1941, now Patent 2,387,336, granted October 23, 1945.

This invention has for its objects to provide compositions particularly suited to the control of insects and fungi; to provide compositions which are not readily wetted by water; to provide compositions capable of depositing heavy, uniform, and adhesive loads of insecticides or fungicides; to provide compositions which may be applied to the surface of the water without wetting in; to avoid the disadvantages of the prior art, and to obtain advantages as will appear hereinafter. Further objects will become apparent as the description proceeds.

These objects are accomplished in the present invention by incorporating in an insecticidal or fungicidal powder composition which normally is hydrolphilic an amount of an aliphatic amine containing at least 8 carbon atoms sufficient to impart hydrophobic properties to the powder but less than about 7.5% by weight of the composition.

It has been suggested to incorporated long-chain aliphatic amines and their salts and the corresponding quaternary ammonium compounds in insecticidal powders either to increase their dispersibility in water or to increase their adherence to foliage. See, for example, French Patent 700,462 and British Patent 373,581. It is clear that the powders which were obtained according to the above patents were not hydrophobic but, on the contrary, in water gave very homogenous dispersions without lump formation. This is entirely in accord with the observations of the present invention which show that in large concentrations, say at 10 percent, which is the concentration specified in Examples 1 and 2 of the patents, even the free amine imparts wettability.

It has also been observed, according to this invention, that with materials which are naturally hydrophobic, such as phenothiazine and sulfur, the amines when incorporated in powders of these materials impart hydrophilic properties thereto. It appears that this difference in effect, depending upon the character of the powdered material, depends upon the orientation of the amine molecule. Thus materials which have an electrokinetic potential such that they are readily wetted by water cause the amine to orient in a manner such as to give hydrophobic properties, whereas with a material the electrokinetic potential of which is such to make it difficultly wettable by water causes orientation of the amine molecule in such a manner as to impart wettabality to the powder. Apparently when a hydrophilic material has incorporated in it a certain quantity of amine, which appears to be as a maximum of about 7.5% on the weight of the composition, any further quantity of amine is oriented in the reverse manner and tends to impart wettability to the product.

According to the invention hydrophobic properties are imparted to insecticidal and fungicidal powders which normally are hydrophilic simply by incorporating an aliphatic amine having at least 8 carbon atoms in an effective amount up to about 7.5% of the weight of the composition. The compositions of the invention may be prepared in any suitable manner, as by milling the ingredients together or by incorporating the amine into the active component of the insecticide or fungicide as a homogenous mixture, for example, by dissolution in a common solvent or by fusion, and there may be included various inert diluent materials such as talc, pyrophyllite, kieselguhr, chalk, lime, magnesia, pumice stone, charcoal, walnut shell flour, wood flour, gypsum, bentonite, Perry clay, and like finely divided solid materials commonly employed in insecticidal and fungicidal compositions.

Compositions prepared according to the invention are of particular advantage in that as applied from an aqueous spray or as a dust to foliage they give high and uniform loads which are resistant to rain and do/not wash off readily, and more particularly when applied as dust disperse on and float on the surface of water and so may be effectively utilized for mosquito larvae control.

The invention may be more fully understood by reference to the following examples in which the parts are by weight unless otherwise specified:

Example 1

A proprietary copper fungicide (believed to have the empirical formula

4Cu(OH)₂.CaCl₂.4H₂O)

99.5 parts and crude free stearylamine 0.5 parts are milled together in a hammer mill. The product does not differ from untreated proprietary copper fungicide in appearance but is now decidedly hydrophobic. By strong agitation in a spray tank the product is partially wetted but flotation is still evident. When sprayed on a foliage surface a definite affinity of the dispersed particles for the plant surface is displayed and an exceptionally heavy load is deposited. Upon drying, the deposit is not readily wetted again and strongly resists removal by rainfall.

*Example 2*

50 parts of crude 4,4'-dichlorodiphenyl-1,1,1-trichloroethane having a setting point of 87.7° C. and 2 parts of stearylamine were dissolved in sufficient acetone that when mixed with 74 parts of talc and 75 parts of Celite there was obtained a paste. This paste was thoroly mixed and dried and sifted whereupon there was obtained a powder which was distinctly hydrophobic.

A material prepared in the same manner and in the same proportions except that the stearylamine was omitted, wetted into the water easily. Material prepared in this manner may be applied by dusting, as from an airplane, to swamps and other breeding places of mosquitoes. By floating on the surface of the water there is built up a toxic barrier to the mosquito larvae which must rise periodically to the surface to obtain oxygen.

*Example 3*

Stearylamine is dissolved in methanol to saturation (about 1.14% solution). 250 cc. of this solution are mixed with 500 grams of Paris green to form a paste and the solvent allowed to evaporate. The product is then milled or otherwise treated to break up agglomerates and there is obtained a hydrophobic product suitable for mosquito control.

While the invention has been described with reference to particular examples it will be understood that the invention is not limited to the details thereof but that variations may be made without departing from the spirit and scope of the invention as long as an aliphatic amine containing at least 8 carbon atoms is in an insecticidal or fungicidal powder in an effective amount up to about 7.5% by weight of the composition.

Any amine having physical characteristics commensurate with the objects to be obtained may be used, and since the physical characteristics of the amines rather than the chemical characteristics are utilized in my invention those skilled in the art, following the principles herein outlined, will be enabled to make suitable selections within the spirit and scope of the invention. The physical characteristics which are most desirable and significant are found in those amines which are solid and water-insoluble. These physical characteristics characterize those amines which have a long aliphatic chain and are free of solubilizing groups and shorter chain aliphatic amines which have insolubilizing groups. Those skilled in the art having these principles and the objects and purposes of the invention in mind will be able to select suitable amines of the preferred type. While it is not possible to draw any general specifications of the structure of such amines it nevertheless can be said that the most desirable characteristics are significantly characteristic of those aliphatic free amines in which the amino substituents are selected from the class consisting of hydrogen and hydrocarbon radicals and which have more than 12 carbon atoms in a single hydrocarbon group.

While the solid water-insoluble amines possess unique advantages the invention is not limited thereto and I have observed the characteristics of my invention, in some degree at least, with diamylamine, octylamine, laurylamine, n-hexadecylamine, n-octadecylamine, dioctylamine, dioctadecylamine, crude stearylamine and both water-soluble and water-insoluble amine salts thereof. Unsaturated amines such as n-octadecenylamine are also suitable, but are less desirable because of frothing tendencies, and in general any aliphatic amine having at least 8 carbon atoms.

Having reference both to foilage tolerance and adhesiveness, maximum efficiency is obtained with those amines which contain more than 12 carbon atoms. Short chain amines appear to be the least desirable and, conversely, the amines having at least one long chain, especially the primary and secondary amines appear to be the most desirable. Similarly, water-soluble amines appear less desirable than water-insoluble amines and the amine salts less desirable than the free amines.

By the term "water-soluble" I mean to include those compounds which, like soap, dissolve in micellar dispersions, and by the term "water-insoluble" I mean to include those that do not but which must be dispersed with the aid of a dispersing agent. The term "amine," unless appearing in the name of a compound or unless otherwise qualified, is intended to include both the salt and the free amine. When I speak of an amine having a designated number of carbon atoms it will be understood that I refer to carbon atoms which are in linear sequence with the amino group. The term "suspension" is to be understood to refer to a soliquoid, that is, a dispersion of solid in a liquid.

I claim:

1. A pest control composition in the form of a powder which normally is hydrophilic containing a toxicant and an amount of an aliphatic amine, containing at least 8 carbon atoms, sufficient to impart hydrophobic properties but less than about 7.5% by weight of the composition.

2. In the method of treating a pest control composition in the form of a powder which normally is hydrophilic to make it hydrophobic, the step of incorporating in said composition an effective amount of an aliphatic amine containing at least 8 carbon atoms up to about 7.5% by weight of the composition.

3. A pest control composition in the form of a powder which normally is hydrophilic containing a toxicant and an amount of a monoalkyl amine containing from at least 12 to not more than 18 carbon atoms sufficient to impart hydrophobic properties but less than about 7.5% by weight of the composition.

4. In the method of treating a pest control composition in the form of a powder which normally is hydrophilic to make it hydrophobic, the step of incorporating in said composition an effective amount of a monoalkyl amine containing from at least 12 to not more than 18 carbon atoms up to about 7.5% by weight of the composition.

5. A pest control composition in the form of a powder which normally is hydrophilic containing a toxicant and an amount of stearylamine sufficient to impart hydrophobic properties but less than about 7.5% by weight of the composition.

6. In the method of treating a pest control composition in the form of a powder which normally is hydrophilic to make it hydrophobic, the step of incorporating in said composition an effective amount of stearylamine up to about 7.5% by weight of the composition.

CLARENCE A. LITTLER.

REFERENCES CITED

The following references are of record in the file of this patent:

UNITED STATES PATENTS

| Number | Name | Date |
|---|---|---|
| 2,030,093 | Bousquet | Feb. 11, 1936 |
| 2,033,866 | Schrauth | Mar. 10, 1936 |
| 2,387,336 | Littler | Oct. 23, 1945 |

FOREIGN PATENTS

| Number | Country | Date |
|---|---|---|
| 373,581 | Great Britain | 1932 |
| 700,462 | France | Dec. 23, 1930 |

OTHER REFERENCES

Jr. Ind. & Eng. Chem., July, 1946, page 4.